March 7, 1933.

H. B. LLOYD

NONSUBSTITUTING CONTAINER

Re. 18,759

Original Filed Feb. 13, 1930 2 Sheets-Sheet 1

Inventor

Harold B. Lloyd

By Lynn H. Latta

Attorney

H. B. LLOYD

March 7, 1933.

NONSUBSTITUTING CONTAINER

Re. 18,759

2 Sheets-Sheet 2

Original Filed Feb. 13, 1930

Inventor

Harold B. Lloyd

By Lynn H. Latta

Attorney

Reissued Mar. 7, 1933

Re. 18,759

UNITED STATES PATENT OFFICE

HAROLD B. LLOYD, OF SIOUX CITY, IOWA

NONSUBSTITUTING CONTAINER

Original No. 1,793,811, dated February 24, 1931, Serial No. 428,071, filed February 13, 1930. Application for reissue filed May 6, 1931. Serial No. 535,540.

My invention relates to non-substituting or non-refillable containers and particularly to lubricating oil drums.

Producers of high grade lubricating oils are constantly faced with the problem of the substitution of inferior oil for the genuine oil sold in their shipping containers under valuable trade-marks. Such practices on the part of the dealer in oils is not only harmful to the producers but is a fraud upon the consuming public as well. The purpose of my invention is to provide an oil drum or container which is of such character that it will be practically impossible for the dealer to refill the drum or to mix an inferior grade of oil with the contents thereof without detection by the manufacturer.

Another object is to prevent substitution without interfering with the ability of the producer to refill the drums.

My invention therefore is comprised in a non-refillable or non-substituting container or oil drum which may be refilled by the producer only.

A further object of my invention is to provide such a container in the form of a simple, inexpensive and durable construction easy to manufacture.

A further object is to provide a container into which dirt and grit cannot find its way during service.

A further object of my invention is to provide a drum of this character which can be drained so as to remove practically all of the oil from the drum.

A further object of my invention is to provide a drum with means for connecting and supporting a pump in a very substantial manner. In connection with this object, it may be stated that the present means for supporting pumps on oil drums is very inadequate. The usual method is to screw the threaded shank of the pump into the threaded boss of the bung hole and since there is no standard size for bung holes, it is almost impossible to obtain a fit between the pump shank and the threaded boss such as to rigidly support the shaft on the drum. An examination of the oil drums of the average oil dealer will show that over seventy-five per cent of the pumps are loose. My invention aims to remedy this defect.

A further object of my invention is to provide a non-substituting drum which may be shipped as easily and as safely as the usual drum.

A further object of my invention is to provide a very simple construction whereby the drum is made not only non-refillable but safe against tampering with the valve which prevents refilling.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
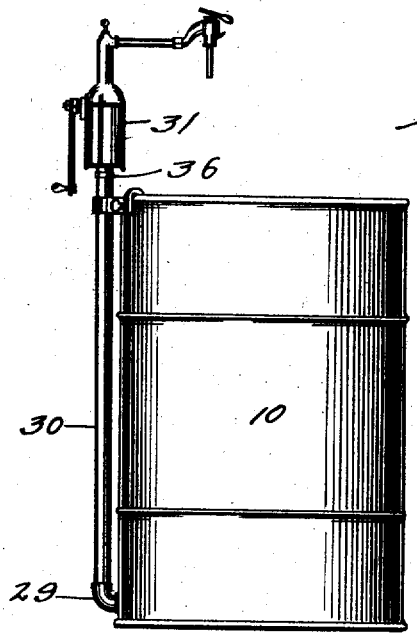
Figure 1 is a side elevation of a drum embodying my invention.
Figure 2:
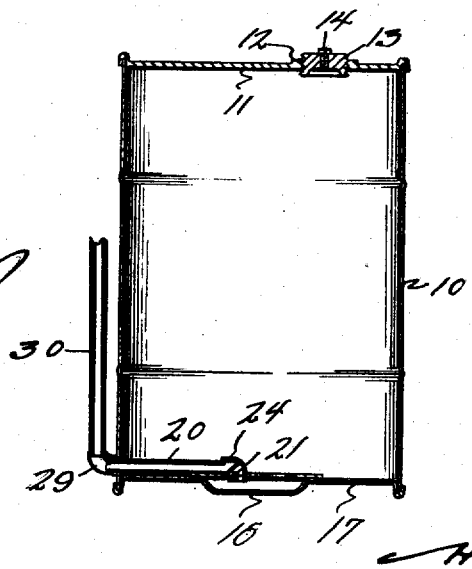
Figure 2 is a sectional view through the drum.

A drum of ordinary construction may be employed in my invention. Such a drum has the cylindrical side wall 10, a top wall 11, a threaded bung hole 12 and the threaded bung 13, which is provided with a small opening, closed by a screw 14 threaded therein. The threaded opening which is closed by the screw 14 is too small for the insertion of oil but when disclosed will allow air to enter the drum as oil is withdrawn therefrom.

Figure 3:
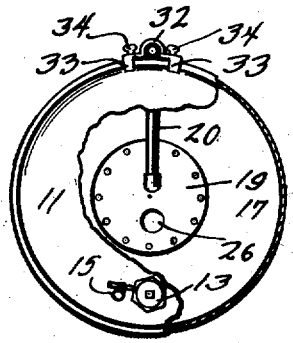
Figure 3 is a plan view of the drum, parts being broken away to show the interior.
Figure 6:
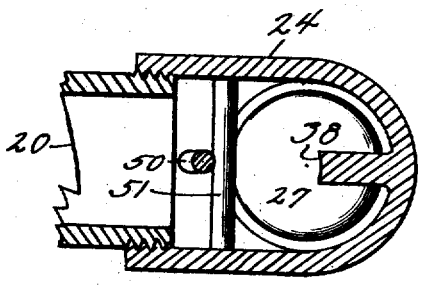
Figure 6 is a sectional view through the valve, taken horizontally on the axis of the withdrawal pipe.

The bung 13 is sealed in any conventional manner as by means of a seal 15, shown in Figure 3, the seal 15 preventing removal of the bung by unauthorized persons.

The bottom wall 17 of the drum is provided with a depressed sump 18, which may be either in the center of the drum or at one side thereof. The object of the sump 18 is to form a space from which oil may be withdrawn, thereby allowing practically all of the oil to be withdrawn from the drum. Another object of the sump is that of aiding in the construction which prevents refilling and tampering.

A plate or false bottom 19 is secured to the inner side of the bottom 17 covering the sump 18 and providing a support for one end of the pipe 20, by means of which oil is withdrawn from the drum. It will be understood in this connection that the drum might be constructed forming the sump 18 as a separate piece and welding it to the lower face of the bottom 17, the bottom 17 being continuous and thus obviating the false bottom 19.

Figure 5:
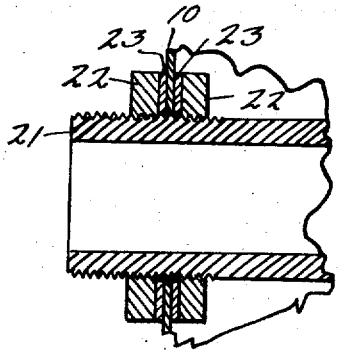
Figure 5 is an enlarged detail view of a portion of Figure 2.

The pipe 20 is extended through the wall 10 of the drum as shown in Figure 5, to provide a threaded projecting end 21 and is secured in place by means of nuts 22 and washers 23. The other end of the pipe 20 is provided with an elbow 24 which is threaded into a threaded opening 25 in the false bottom 19. It will be understood that the elbow 24 might be secured in the false bottom 19 in other ways than by threading.

The false bottom 19 is provided with an opening 26 to allow oil to fill the sump.

A ball valve 27 is seated against the valve seat 28, either threaded into the end of the elbow 24 or formed integrally therewith.

To the threaded end 21 of the pipe 20 the dealer secures the elbow 29 of a pipe 30, which serves as a support for the pump 31 and as a means of pumping oil from the drum.

The upper end of the pipe 30 is secured by a clamp having a yoke portion 32 to encircle the pipe, a pair of hooks 33 to hook over the flange of the top 11 and a pair of thumb screws 34 to tighten the hooks 33 in engagement with the flange. The construction of the clamp is thought to be obvious from the drawings.

A series of lugs 35 act as struts to space the false bottom 19 and sump 18 apart. It will be understood that the lugs may or may not be used, depending upon the strength of the metal used in the walls of the drum and in some instances one may be sufficient.

It will now be seen that the pipe 20 is rigidly attached at both ends to the drum, one end being permanently positioned where it can receive oil from the sump 18 and the other end being adapted to support the lower end of the pipe 30. The construction of the pipe 20 is such that oil cannot be inserted into the drum through it whether the pipe 30 is attached or unattached. The non-refillable function does not depend upon the closing of the outer end of the pipe 20 but is fulfilled by the construction of the inner end thereof.

The combination of the projecting end 21 of the pipe 20 and the clamp 32 with the pipe 30 makes it possible to support the pump 31 in proper position above the drum, the pipe 30 forming a very rigid support for the pump. It will be understood that an adapter nipple 36 may be employed to connect the pipe 30 to the pump 31 or the elbow 29 may be used as an adapter and different sized pipes 30 permanently attached to their pumps may be employed. It will be understood that this provision is only made for the unlikely possibility of pumps being made with different sized connections. However, at the present time it is a practice to make pumps with standard ¾ inch connections.

On the other hand, bung openings of the present oil drums are all of different sizes and I have found from an actual check-up on the oil equipment of various dealers which I have inspected that only about fifty per cent of the pumps are rigidly attached to their drums in the average case.

Furthermore, the pump is not held rigidly even where a tight fit can be had between the pump connection and the oil drum bung hole for the reason that the pump is secured only at the top and the lower end of the pipe depends loosely within the barrel. Since the bung hole is ordinarily located at a distance from the edge of the top, the resiliency of the top wall will allow the pump to sway during the pumping operation and it is almost universally necessary for the operator to grasp the pump with his left hand while pumping.

The present invention does away with all of these objections and provides a sure mounting for the pump. It may also be noted that inasmuch as the non-refillable drum makes it impossible to employ a return drain that there will be no possibility of dirt and grit getting into the drum through returned oil. In this connection it is well known that the present types of pumps are so well constructed that the instant pumping is stopped, the oil flow will stop.

It may now be noted that when the drum is shipped from the factory, it is minus the pipe 30 and elbow 29, only the short end 21 of the pipe 20 projecting from the side of the barrel. In actual practice this end will be capped wth a threaded cap or plug so as to prevent dirt collecting within the pipe 20 and to prevent oil leakage, due to occasional unseating of the valve during jolting or jarring of the drum in transportation.

Figure 4:
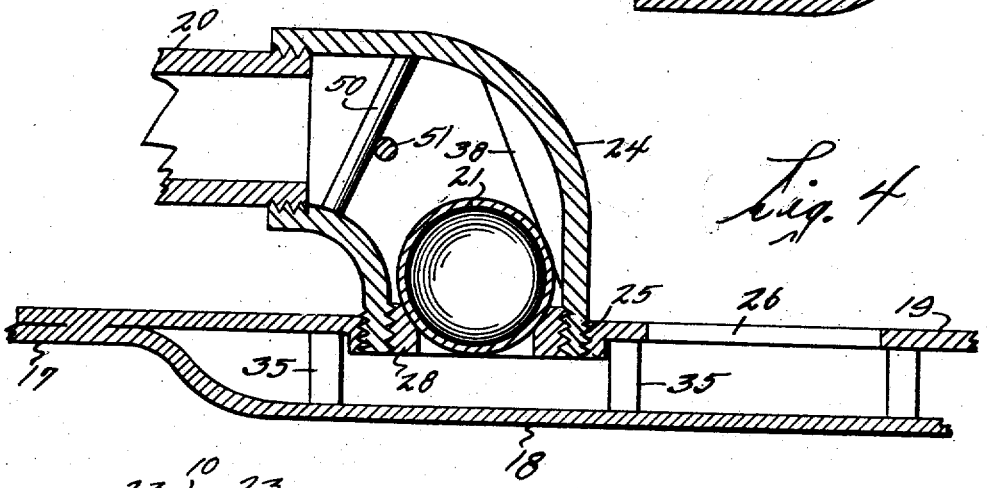
Figure 4 is an enlarged detail view of portions of Figure 2.

The elbow 24 is provided with a rib or ribs 38, inclined from the valve seat 28 toward the opposite end of the elbow sufficiently so that should the drum be turned on its side so as to project the end 21 of the pipe 20 upwardly the ball 27 will not become unseated. In this connection it may be stated the the ball 27 must be of sufficient weight so that it will not float in oil. Its weight keeps it seated against the valve seat 28 and whether the drum is in proper upright position or lying on its side as described, the valve will remain at all times closed. The angle of the rib 38 is not, however, such as to interfere with the normal action of the valve when oil is being pumped out of the drum. This is thought to be obvious from an inspection of Figure 4.

The space within the elbow 24 is such as to leave the equivalent of the capacity of a ¾ inch pipe around the valve when the valve is unseated.

I provide a device for aiding in the prevention of the insertion of an instrument through the withdrawal pipe so as to protect the valve against being unseated. It comprises a pair of crossed pins 50 and 51 mounted in the elbow 24.

The sharp bend in the elbow is primarily responsible for prevention of tampering with the valve.

Attention is called to the fact that my invention makes it possible to use a drum in which there is no opening through which dirt can enter the drum during the time when the drum is in other hands than those of the manufacturer. The filling opening which is the only one which could allow dirt to enter the drum could only be disclosed by the removal of the seal. Any type of drum which has an opening which is accessible to the dealer is subject to the possibility of dirt entering it.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In a non-substituting container having top and bottom walls and a side wall, a withdrawal pipe extending through the side wall near the bottom of the container and projecting into the container and thence bent downwardly to a position adjacent the bottom of the container, a member secured to the bottom of the container and secured to the inner end of said withdrawal pipe to hold the same rigidly in position and an outwardly opening check valve associated with the inner end of the withdrawal pipe, the outer end of the withdrawal pipe projecting beyond the side wall to form means for attachment of a pumping mechanism.

2. A non-substituting container having top and bottom walls and a side wall, a withdrawal pipe extending through the side wall near the bottom of the container and projecting into the container and thence bent downwardly, a sump formed in the bottom of the container, the inner end of the withdrawal pipe extending into the sump and the mouth of the withdrawal pipe being positioned close to the bottom thereof, a member projecting across the sump and secured to the bottom wall of the container, said member being attached to and supporting the inner end of the withdrawal pipe in a rigid position, the outer end of the withdrawal pipe projecting beyond the side wall to form means for attachment of a pumping mechanism, and an outwardly opening check valve associated with the inner end of the withdrawal pipe.

3. A container having top and bottom walls and a side wall, a withdrawal pipe extending through the side wall near the bottom of the container and projecting into the container and thence bent downwardly, a member attached to the bottom of the container and to the inner end of the withdrawal pipe to support the mouth of the latter in a position closely adjacent the bottom of the container, the outer end of the withdrawal pipe extending beyond the side wall of the container, a pump supporting pipe provided with means at its lower end for removable attachment to said projecting end of the withdrawal pipe and means attached to said pump supporting pipe and engaging the upper rim of the container to hold the pump supporting pipe rigidly in position to provide a substantial support for a pump.

4. A container having top and bottom walls and a side wall, a withdrawal pipe extending through the side wall near the bottom of the container and projecting into the container and thence bent downwardly, a sump formed in the bottom of the container, the inner end of the withdrawal pipe extending into the sump and the mouth of the withdrawal pipe being positioned close to the bottom thereof, a member projecting across the sump and secured to the bottom wall of the container, said member being attached to and supporting the inner end of the withdrawal pipe in a rigid position, the outer end of the withdrawal pipe projecting beyond the side wall, a pump supporting pipe provided with means at its lower end for removable attachment to said projecting end of the withdrawal pipe and means attached to said pump supporting pipe and engaging the upper rim of the container to hold the pump supporting pipe rigidly in position to provide a substantial support for a pump.

5. A container having top and bottom walls and a side wall, a withdrawal pipe attached to the side wall near the bottom of the container and projecting into the container and thence bent downwardly, a member attached to the bottom of the container and to the inner end of the withdrawal pipe to support the mouth of the latter in a position closely adjacent the bottom of the container, the outer end of the withdrawal pipe communicating with the exterior of the container, a pump supporting pipe provided with means at its lower end for removable attachment to said outer end of the withdrawal pipe, and means attached to said pump supporting pipe and engaging the upper rim of the container to hold the pump supporting pipe rigidly in position to provide a substantial support for a pump.

6. A container having top and bottom walls and a side wall, a withdrawal pipe attached to the side wall near the bottom of the container and projecting into the container and thence bent downwardly, a sump formed in the bottom of the container, the inner end of the withdrawal pipe extending into the sump and provided with a mouth positioned close to the bottom thereof, a member projecting across the sump and secured to the bottom wall of the container, said member being attached to and supporting the inner end of the withdrawal pipe in a rigid position, the outer end of the withdrawal pipe communicating with the exterior of the container, a pump supporting pipe provided with means at its lower end for removable attachment to said outer end of the withdrawal pipe, and means attached to said pump supporting pipe and engaging the upper rim of the container to hold the pump supporting pipe rigidly in position to provide a substantial support for a pump.

7. A container having top and bottom walls and a side wall, a withdrawal pipe attached to the side wall near the bottom of the container and projecting into the container and thence bent downwardly, a member attached to the bottom of the container and to the inner end of the withdrawal pipe to support the mouth of the latter in a position closely adjacent the bottom of the container, the outer end of the withdrawal pipe communicating with the exterior of the container, a pump supporting pipe provided with means at its lower end for removable attachment to said outer end of the withdrawal pipe, and means attached to said pump supporting pipe and attached to the container near its upper extremity to hold the pump supporting pipe rigidly in position to provide a substantial support for a pump.

8. A container having top and bottom walls and a side wall, a withdrawal pipe attached to the side wall near the bottom of the container and projecting into the container and thence bent downwardly, a sump formed in the bottom of the container, the inner end of the withdrawal pipe extending into the sump and provided with a mouth positioned close to the bottom thereof, a member projecting across the sump and secured to the bottom wall of the container, said member being attached to and supporting the inner end of the withdrawal pipe in a rigid position, the outer end of the withdrawal pipe communicating with the exterior of the container, a pump supporting pipe provided with means at its lower end for removable attachment to said outer end of the withdrawal pipe, and means attached to said pump supporting pipe and attached to the container near its upper extremity to hold the pump supporting pipe rigidly in position to provide a substantial support for a pump.

Signed this 18th day of April, 1931, at Sioux City, Iowa.

HAROLD B. LLOYD.